(12) United States Patent
Chamarti

(10) Patent No.: US 10,674,375 B2
(45) Date of Patent: *Jun. 2, 2020

(54) MULTIPLE APPLICATION MODULES (MAMS) FOR MONITORING SIGNALS IN COMPONENTS IN WIRELESS DISTRIBUTION SYSTEMS, INCLUDING DISTRIBUTED ANTENNA SYSTEMS (DASS), AND RELATED SYSTEMS AND METHODS

(71) Applicant: Corning Optical Communications LLC, Hickory, NC (US)

(72) Inventor: Aravind Chamarti, Ashburn, VA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,818

(22) Filed: Apr. 12, 2019

(65) Prior Publication Data

US 2019/0239089 A1     Aug. 1, 2019

Related U.S. Application Data

(63) Continuation of application No. 15/914,111, filed on Mar. 7, 2018, now Pat. No. 10,299,143, which is a
(Continued)

(51) Int. Cl.
*H04W 4/20* (2018.01)
*H04W 16/26* (2009.01)
(Continued)

(52) U.S. Cl.
CPC ............. *H04W 16/26* (2013.01); *H04W 4/20* (2013.01); *H04W 24/02* (2013.01); *H04W 88/085* (2013.01)

(58) Field of Classification Search
CPC ....... H04W 4/20; H04W 24/02; H04W 52/00; H04W 52/04; H04W 52/40;
(Continued)

(56) References Cited

U.S. PATENT DOCUMENTS 7,089,014 B2   8/2006   Brown et al.
7,606,594 B2   10/2009  Jesse et al.
(Continued)

FOREIGN PATENT DOCUMENTS

EP     1699249 A1    9/2006
EP     2081334 A1    7/2009
(Continued)

*Primary Examiner* — Jean A Gelin
(74) *Attorney, Agent, or Firm* — C. Keith Montgomery

(57) ABSTRACT

Multiple application modules (MAMs) for monitoring of signals in components in wireless distribution systems (WDSs), including but not limited to distributed antenna systems (DASs) are disclosed. The MAMs are wireless telecommunication circuitry associated with wireless distribution components in a WDS, such as communications and power components as examples. By associating MAMs into components of a WDS, live signals in the WDS can be monitored and measured for monitoring the performance of components within the WDS. The MAMs include a multiple application software platform architecture that includes one or more application layer applications configured to receive and monitor signals in the WDS, and to provide application level information about such monitored signals to other systems or technicians. The application level information can be used by a technician or other system to diagnose or calibrate the WDS and/or the communications components provided therein.

18 Claims, 10 Drawing Sheets

Related U.S. Application Data continuation of application No. 15/332,552, filed on Oct. 24, 2016, now Pat. No. 9,930,540, which is a continuation of application No. PCT/US2015/032397, filed on May 26, 2015.

(60) Provisional application No. 62/003,761, filed on May 28, 2014.

(51) Int. Cl.
    *H04W 24/02* (2009.01)
    *H04W 88/08* (2009.01)

(58) Field of Classification Search
    CPC . H04W 52/146; H04W 52/143; H04W 16/26; H04W 88/085
    See application file for complete search history.

(56) References Cited

U.S. PATENT DOCUMENTS

| | | | |
|---|---|---|---|
| 8,326,313 | B2 | 12/2012 | McHenry et al. |
| 9,930,540 | B2* | 3/2018 | Chamarti ............... H04W 24/02 |
| 2001/0036163 | A1 | 11/2001 | Sabat, Jr. et al. |
| 2004/0225740 | A1 | 11/2004 | Klemba et al. |
| 2008/0070619 | A1 | 3/2008 | Yu |
| 2008/0291985 | A1 | 11/2008 | Adnani et al. |
| 2009/0313299 | A1 | 12/2009 | Bonev |
| 2010/0097952 | A1 | 4/2010 | McHenry et al. |
| 2010/0105332 | A1 | 4/2010 | McHenry et al. |
| 2010/0121975 | A1 | 5/2010 | Sinha et al. |
| 2010/0173586 | A1 | 7/2010 | McHenry et al. |
| 2011/0059741 | A1 | 3/2011 | Klein |
| 2011/0170424 | A1 | 7/2011 | Safavi |
| 2011/0208968 | A1 | 8/2011 | Inada |
| 2011/0277001 | A1 | 11/2011 | Kaluskar et al. |
| 2012/0092350 | A1 | 4/2012 | Ganapathi et al. |
| 2012/0134328 | A1 | 5/2012 | Gauvreau et al. |
| 2012/0327800 | A1* | 12/2012 | Kim ................... H04W 72/082 370/252 |
| 2013/0017792 | A1 | 1/2013 | Miller, II |
| 2013/0081103 | A1 | 3/2013 | Uner et al. |
| 2013/0095870 | A1* | 4/2013 | Phillips ............... H04W 52/146 455/501 |
| 2013/0150063 | A1 | 6/2013 | Berlin et al. |
| 2013/0337750 | A1* | 12/2013 | Ko ........................ H04W 24/00 455/67.13 |
| 2014/0050482 | A1* | 2/2014 | Berlin .................... H04B 7/155 398/115 |
| 2014/0051372 | A1 | 2/2014 | Shoshan et al. |
| 2014/0146692 | A1 | 5/2014 | Hazani et al. |
| 2014/0187243 | A1* | 7/2014 | Rune ..................... H04W 36/04 455/436 |
| 2014/0233442 | A1 | 8/2014 | Atias et al. |
| 2014/0280442 | A1 | 9/2014 | Jiang et al. |
| 2014/0310449 | A1 | 10/2014 | Chiang et al. |
| 2015/0032511 | A1 | 1/2015 | Haddad et al. |
| 2015/0199196 | A1 | 7/2015 | Cairns et al. |
| 2015/0205567 | A1 | 7/2015 | Seo et al. |
| 2015/0229386 | A1 | 8/2015 | Lange |
| 2015/0285637 | A1 | 10/2015 | Kelly |
| 2015/0331480 | A1 | 11/2015 | Zhou et al. |
| 2015/0348022 | A1 | 12/2015 | Khan et al. |
| 2015/0379834 | A1 | 12/2015 | Datta et al. |
| 2016/0302116 | A1 | 10/2016 | Chamarti et al. |
| 2016/0352393 | A1 | 12/2016 | Berlin et al. |
| 2017/0286066 | A1 | 10/2017 | Gathala et al. |
| 2018/0331991 | A1 | 11/2018 | Kim et al. |

FOREIGN PATENT DOCUMENTS

| | | |
|---|---|---|
| EP | 2696617 A1 | 2/2014 |
| EP | 2764713 A2 | 8/2014 |
| WO | 2006052759 A2 | 5/2006 |
| WO | 2010022156 A2 | 2/2010 |
| WO | 2012134538 A1 | 10/2012 |
| WO | 2012173570 A1 | 12/2012 |
| WO | 2013028119 A1 | 2/2013 |
| WO | 2013096563 A1 | 6/2013 |
| WO | 2015183791 A1 | 12/2015 |
| WO | 2016112308 A2 | 7/2016 |

* cited by examiner

MULTIPLE APPLICATION MODULES (MAMS) FOR MONITORING SIGNALS IN COMPONENTS IN WIRELESS DISTRIBUTION SYSTEMS, INCLUDING DISTRIBUTED ANTENNA SYSTEMS (DASS), AND RELATED SYSTEMS AND METHODS

CROSS-REFERENCE TO RELATED APPLICATION

This application is a continuation of U.S. application Ser. No. 15/914,111, filed Mar. 7, 2018, which is a continuation of U.S. application Ser. No. 15/332,552, filed Oct. 24, 2016, which is a continuation of International Application No. PCT/US2015/032397, filed on May 26, 2015, which claims the benefit of priority under 35 U.S.C. § 119 of U.S. Provisional Application No. 62/003,761, filed on May 28, 2014, the content of which is relied upon and incorporated herein by reference in its entirety.

BACKGROUND

The technology of the present disclosure relates generally to multiple application modules (MAMs) for monitoring of signals in components of wireless distribution systems (WDSs), including distributed antenna systems (DASs). The wireless distribution systems supports distributing communications services to remote units, and particularly to MAMs included in components of the WDSs for monitoring and/or measuring spectrum information (e.g., signals) within the WDS.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). WDSs communicate with wireless devices called "clients," "client devices," or "wireless client devices," which reside within the wireless range or "cell coverage area" in order to communicate with an access point device. One example of a WDS is a DAS. DASs are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates an example of distribution of communications services in a WDS. FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

In the DAS 12 in FIG. 1, after installation and commissioning, a site walk is typically performed to analyze the data quality for optimization of the coverage areas 10(1)-10(N) created by the remote antenna units 14(1)-14(N). The site walk may involve activating the DAS 12 for the central unit 16 to receive the downlink communications signals 20D from the base station 18 for distribution to the remote antenna units 14(1)-14(N). Then, a service technician walks around the different coverage areas 10(1)-10(N) with a wireless communication device, such as a mobile phone or laptop computer, to receive the distributed downlink communications signals 20D from the remote antenna units 14(1)-14(N). The received downlink communications signals 20D can be reviewed and analyzed by personnel conducting the site walk to determine the quality of the coverage areas 10(1)-10(N), such as signal strength as an example. The DAS 12 may also be configured to generate alarms indicative of signal quality. Any quality issues in the DAS 12 can be identified and resolved. However, the context of the received downlink communications signals 20D is not known. For example, it is not known which received downlink communications signals 20D and/or how many communications bands are being distributed in the DAS 12.

No admission is made that any reference cited herein constitutes prior art. Applicant expressly reserves the right to challenge the accuracy and pertinency of any cited documents.

SUMMARY

Embodiments disclosed herein include multiple application modules (MAMs) for monitoring of signals in components in wireless distribution systems (WDSs), including but not limited to distributed antenna systems (DASs). Related systems and methods are also disclosed. The MAMs are wireless telecommunication circuitry associated with wireless distribution components in a WDS, such as communications and power components as examples. By associating the MAMs into components of a WDS, live signals in the WDS can be monitored and measured for monitoring the performance of components within the WDS. The MAMs include a multiple application software platform architecture that includes one or more application level applications configured to receive and monitor signals in the WDS, and to provide application level information about such monitored signals to other components or systems, or technicians. The application level information can be used by a technician or other system to diagnose or calibrate the WDS and/or the communications components provided therein.

In one embodiment, the MAMs are configured to receive signals, including communications signals, distributed in the WDS like client devices. The MAMs are configured to transmit communications signals within the WDS, like client devices, to other recipients, including technician or service personnel communications devices to provide the application level information about monitored signals. The MAMs can also be configured to act as an access point for transmitting application level information to other MAMs or other components in the WDS. Also, because the MAMs have the functionality of client devices, the MAMs may also be configured to receive calls or other communications from another system through the WDS to retrieve the application level information from the MAMs. Further, because the application layer applications in the MAMs may be open architecture applications, customers or technicians may be able to load their own applications in the MAMs, including customized applications, for monitoring signals in their WDS and providing application level information.

One embodiment of the disclosure relates to a wireless distribution system (WDS). The WDS comprises a central unit. The central unit is configured to receive a downlink communications signal from a communications system. The central unit is also configured to distribute the downlink communications signal over at least one downlink communications medium to a plurality of remote units. The central unit is also configured to receive an uplink communications signal from the plurality of remote units over at least one uplink communications medium. The central unit is also configured to distribute the uplink communications signal to the communications system. Each remote unit among the plurality of remote units is configured to receive the downlink communications signal from the central unit over the at least one downlink communications medium. Each remote unit among the plurality of remote units is also configured to distribute the downlink communications signal to a client device. Each remote unit among the plurality of remote units is also configured to receive the uplink communications signal from the client device. The plurality of remote units are also each configured to distribute the uplink communications signal to the central unit over the at least one uplink communications medium. The WDS also comprises at least one multiple application module (MAM) associated with at least one of the central unit and at least one of the remote units among the plurality of remote units. The MAM comprises at least one processor. The at least one processor is configured to execute at least one application layer application to analyze the at least one of the downlink communications signal and the uplink communications signal. The at least one MAM is also configured to receive at least one of the downlink communications signal and the uplink communications signal, and communicate application level information regarding the analyzed at least one of the downlink communications signal and the uplink communications signal to another system.

Another embodiment of the disclosure relates to a method of monitoring signals in a wireless distribution system. The method comprises receiving a downlink communications signal from a communications system in a central unit. The method also comprises distributing the downlink communications signal over at least one downlink communications medium to a plurality of remote units. The method also comprises receiving an uplink communications signal from the plurality of remote units over at least one uplink communications medium in the central unit. The method also comprises distributing the received downlink communications signal in each remote unit among the plurality of remote units to a client device. The method also comprises receiving the uplink communications signal in each remote unit among the plurality of remote units from the client device. The method also comprises distributing the received uplink communications signal in each remote unit among the plurality of remote units to the central unit. The method also comprises executing at least one application layer application in at least one processor in at least one MAM associated with at least one of the central unit and at least one of the remote units among the plurality of remote units to analyze the at least one of the downlink communications signal and the uplink communications signal. The method also comprises communicating application level information regarding the analyzed at least one of the downlink communications signal and the uplink communications signal to another system Another embodiment of the disclosure relates to a non-transitory computer-readable medium having stored thereon computer executable instructions to cause a processor-based multiple application module (MAM) to: receive a downlink communications signal from a communications system in a central unit, distribute the downlink communications signal over at least one downlink communications medium to a plurality of remote units, receive an uplink communications signal from the plurality of remote units over at least one uplink communications medium in the central unit, distribute the received downlink communications signal in each remote unit among the plurality of remote units to a client device, receive the uplink communications signal in each remote unit among the plurality of remote units from the client device, distribute the received uplink communications signal in each remote unit among the plurality of remote units to the central unit, execute at least one application layer application in at least one processor in at least one MAM associated with at least one of the central unit and at least one of the remote units among the plurality of remote units to analyze the at least one of the downlink communications signal and the uplink communications signal, and communicate application level information regarding the analyzed at least one of the downlink communications signal and the uplink communications signal to another system.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Various embodiments will be further clarified by the following examples.

Embodiments disclosed herein include multiple application modules (MAMs) for monitoring of signals in components in wireless distribution systems (WDSs), including but not limited to distributed antenna systems (DASs). Related systems and methods are also disclosed. The MAMs are wireless telecommunication circuitry associated with wireless distribution components in a WDS, such as communications and power components as examples. By associating the MAMs with one or more components of a WDS, live signals in the WDS can be monitored and measured for monitoring the performance of components within the WDS. The MAMs include a multiple application software platform architecture that includes one or more application layer applications configured to receive and monitor signals in the WDS, and to provide application level information about such monitored signals to other components or systems, or technicians. The application level information can be used by a technician or other system to diagnose or calibrate the WDS and/or the communications components provided therein.

Figure 1:
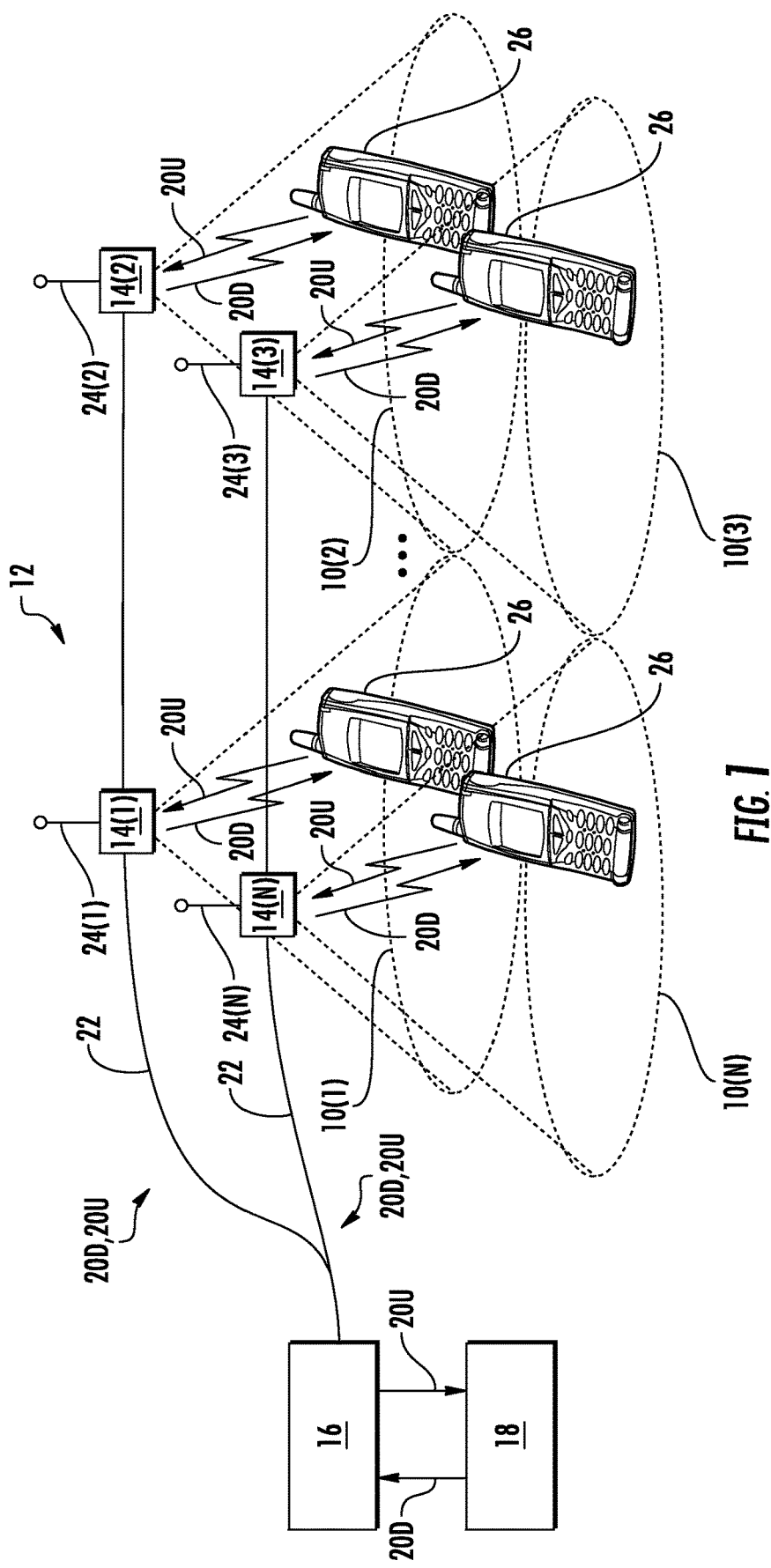
FIG. 1 is a schematic diagram of an exemplary wireless distribution system (WDS) in the form of a distributed antenna system (DAS) capable of distributing radio frequency (RF) communications services to client devices.
Figure 2:
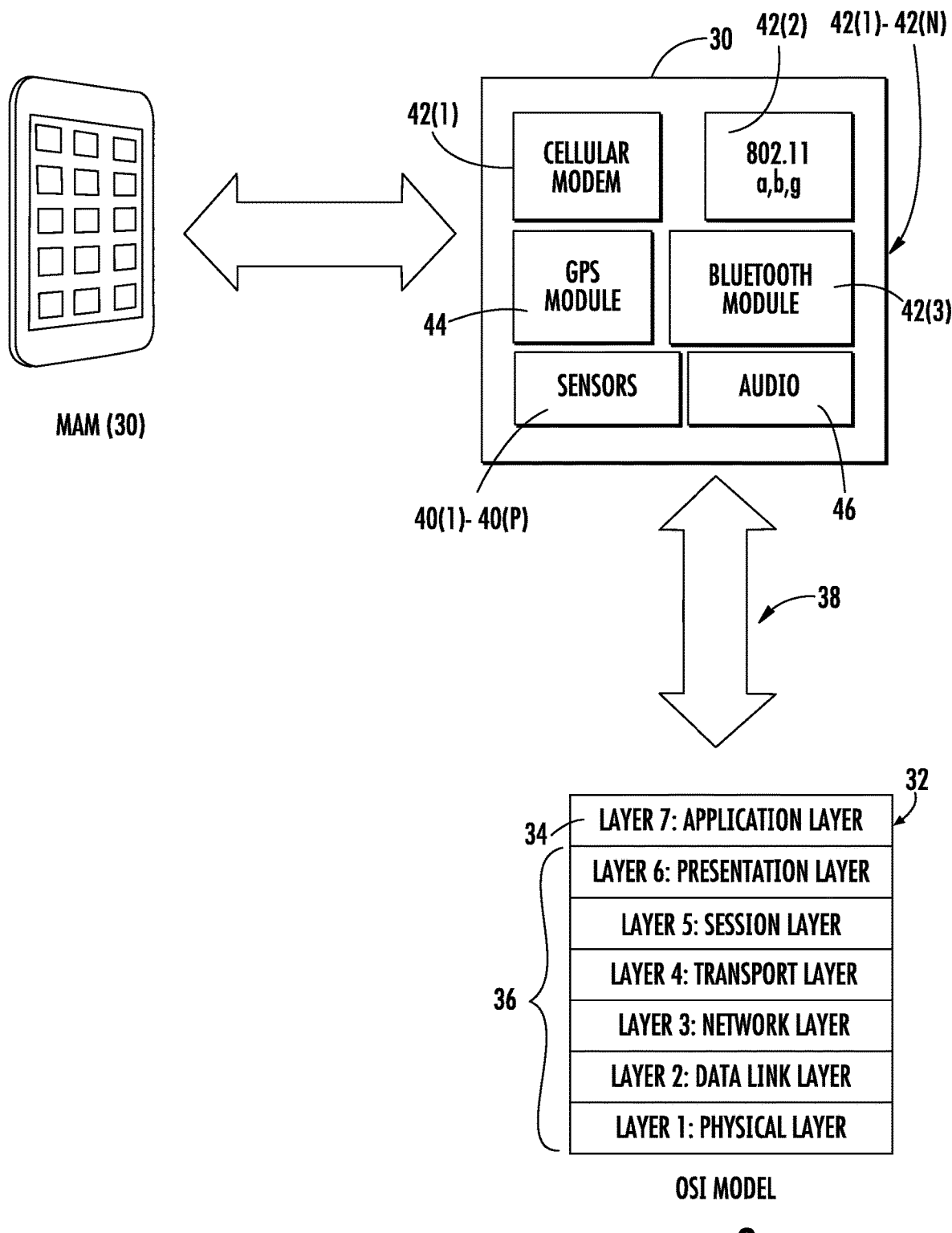
FIG. 2 is a schematic diagram of an exemplary multiple application module (MAM) that can be associated with one or more components of a DAS WDS to monitor live signals in the WDS, create application level information about the monitored signals, and communicate the application level information to other systems.

In this regard, FIG. 2 is a schematic diagram of an exemplary MAM 30. As will be discussed in more detail below, the MAM 30 can be associated with one or more components of a WDS as a client device to monitor live signals (e.g., component power, RF power or communications signals) in the WDS and create application level information (e.g., application level data) about the monitored signals. The MAM 30 is configured with one or more application layer applications 32, such as provided in an application layer 34 of an OSI model, as a non-limiting example. In this example, an application layer application 32 is configured to retrieve information about monitored signals in a WDS from lower layers 36 in the MAM 30 to generate application level information 38 about the monitored signals. Context information can be included in the application level information 38 about the monitored signals for additional information that requires application level processing, as opposed to lower layer signal monitoring that may not include context information.

For example, the MAM 30 may include one or more sensors 40(1)-40(P) that can be employed to sense information about monitored signals in a WDS that is provided to software application layer application 32 (also referred to herein as "application layer application 32") in the application layer 34 of the MAM 30 to generate application level information 38 about the monitored signals. For example, one of the sensors 40 may be a power level detector configured to determine a power level (e.g., a RF power level) of a monitored signal, wherein the application level information 38 relates to power level of the monitored signals. As an example, the application level information 38 may include a history of power level information for the monitored signal, as opposed to just a physical level power level, for additional context information. Thus, the power level information in the application level information 38 may be more useful in calibrating gain levels in the WDS than just one power level about the monitored signal. The application layer application 32 in the MAM 30 can then communicate this application level information 38 through a communications interface to other systems for use in diagnosing and/or calibrating a WDS. Further, because the application layer applications 32 in the MAM 30 may be open architecture applications, customers or technicians may be able to load their own application layer applications in the MAM 30, including customized applications, for monitoring signals in their WDS and providing application level information 38, and/or forming an application network.

In this regard, with continuing reference to FIG. 2, the MAM 30 in this embodiment includes a number of communications interfaces 42(1)-42(N) that can communicate the application level information 38 to other systems. For example, the communications interfaces 42 can include a cellular modem 42(1), WiFi interface 42(2), and Bluetooth module 42(3), as shown in FIG. 2. As will be described in more detail below, the MAM 30 will be incorporated into a WDS component as a client device that is capable of receiving communications distributed through the DAS, such as cellular communications signals through the cellular modem 42(1) and WiFi signals through the WiFi interface 42(2). Because, the MAM 30 appears as a client device in the WDS, the MAM 30 can also transmit communications signals through a communications interface 42 within a WDS like client devices, or outside the WDS, to other recipients, including technician or service personnel communications devices to provide the application level information 38 about monitored signals. The Bluetooth module 42(3) in this example allows for local communications to the MAM 30 to retrieve application level information 38 outside of the WDS, if desired. Also, because the MAM 30 has the functionality of a client device in the WDS, the MAM 30 may also be configured to receive calls or other communications from another system through the WDS to retrieve the application level information 38 from the MAM 30. In this regard, the application layer applications 32 in the MAM 30 may facilitate the MAM 30 to initiate providing application level information 38 to other systems without being requested, such as due to alarm conditions or other criteria or thresholds being exceeded.

The MAM 30 may also have other components that are useful in monitoring signals in a WDS. For example, the MAM 30 may include a global positioning module (GPS) 44 that can allow the MAM 30 to determine its location and communicate this location in conjunction with application level information 38. The MAM 30 may also include an audio component 46, such as to allow the MAM 30 to respond to voice commands or provide application level information 38 about monitored signals audially, as examples.

Because the MAM 30 provides application layer application 32 for providing application level information 38 about monitored signals, less cost and faster development times may be realized since changes to the application layer applications can be made in software rather than through hardware updates. The MAM 30 allows uploads for new application layer applications 32 to be provided in the application layer 34 or updates to existing application layer applications 32 in the application layer 34. Also, by allowing for application layer applications 32 in the MAM 30, outsider developers, including individual developers, can develop third party software applications for the MAM 30 for further availability to WDS application layer applications for cost effective development.

Figure 3A:
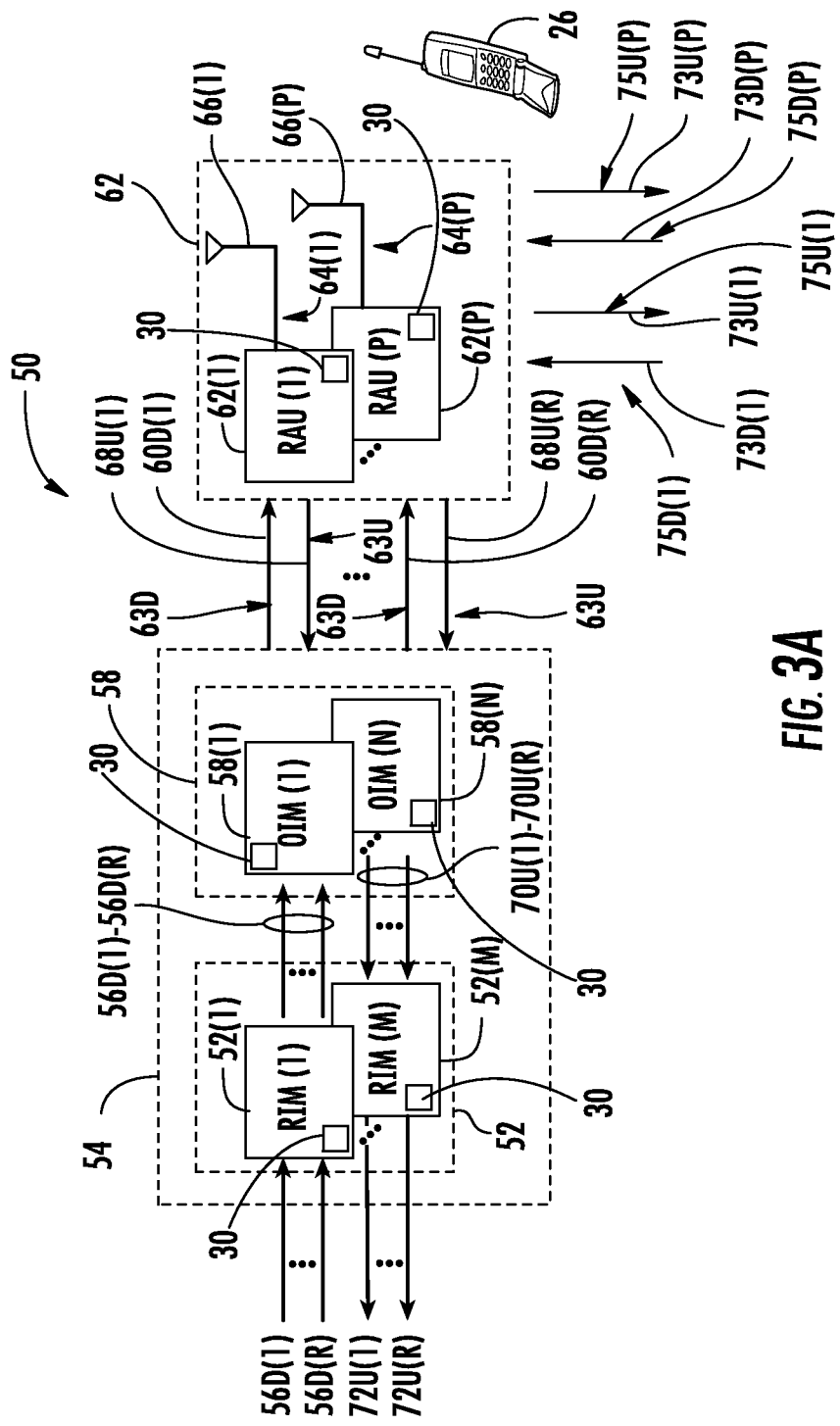
FIGS. 3A and 3B are schematic diagrams illustrating an exemplary optical fiber-based DAS that includes components in which the MAM in FIG. 2 can be included.

FIG. 3A is a schematic diagram of another exemplary optical fiber-based distributed antenna system (DAS) 50 as an example of a WDS that may include MAMs 30 for monitoring of signals. In this embodiment, the optical fiber-based DAS 50 includes optical fiber for distributing RF communication services. The optical fiber-based DAS 50 in this embodiment is comprised of three (3) main components. One or more radio interfaces provided in the form of radio interface modules (RIMs) 52(1)-52(M) in this embodiment are provided in head end equipment (HEE) 54 to receive and process downlink electrical RF communications signals 56D(1)-56D(R) from one or more base stations 57(1)-57(T) (FIG. 3B) prior to optical conversion into downlink optical RF communications signals. The RIMs 52(1)-52(M) provide both downlink and uplink interfaces. The notations "1-R" and "1-M" indicate that any number of the referenced component, 1-R and 1-M, respectively, may be provided. MAMs 30 can be included in the RIMs 52(1)-52(M) or provided in the same location, housing, or packaging as the RIMs 52(1)-52(M), to monitor the downlink electrical RF communications signals 56D(1)-56D(R) prior to optical conversion into downlink optical RF communications signals. As will be described in more detail below, the HEE 54 is configured to accept a plurality of RIMs 52(1)-52(M) as modular components that can easily be installed and removed or replaced in the HEE 54. In one embodiment, the HEE 54 is configured to support up to eight (8) RIMs 52(1)-52(8).

Each RIM 52(1)-52(M) can be designed to support a particular type of radio source or range of radio sources (i.e., frequencies) to provide flexibility in configuring the HEE 54 and the optical fiber-based DAS 50 to support the desired radio sources. For example, one RIM 52 may be configured to support the Personal Communication Services (PCS) radio band. Another RIM 52 may be configured to support the 700 MHz radio band. In this example, by inclusion of these RIMs 52, the HEE 54 would be configured to support and distribute RF communications signals on both PCS and LTE 700 radio bands. RIMs 52 may be provided in the HEE 54 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 52 may be provided in the HEE 54 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 52 may be provided in the HEE 54 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 56D(1)-56D(R) are provided to a plurality of optical interfaces provided in the form of optical interface modules (OIMs) 58(1)-58(N) in this embodiment to convert the downlink electrical RF communications signals 56D(1)-56D(N) into downlink optical RF communications signals 60D(1)-60D(R). MAMs 30 can also be included in the OIMs 58(1)-58(N), or provided in the same location, housing, or packaging as the OIMs 58(1)-58(N), to monitor the downlink electrical RF communications signals 56D(1)-56D(R) prior to optical conversion into downlink optical RF communications signals 60D(1)-60D(R). The notation "1-N" indicates that any number of the referenced component 1-N may be provided. The OIMs 58 may be configured to provide one or more optical interface components (OICs) that contain O/E and E/O converters, as will be described in more detail below. The OIMs 58 support the radio bands that can be provided by the RIMs 52, including the examples previously described above. Thus, in this embodiment, the OIMs 58 may support a radio band range from 400 MHz to 2700 MHz, as an example, so providing different types or models of OIMs 58 for narrower radio bands to support possibilities for different radio band-supported RIMs 52 provided in the HEE 54 is not required. Further, as an example, the OIMs 58 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 58(1)-58(N) each include E/O converters to convert the downlink electrical RF communications signals 56D(1)-56D(R) to downlink optical RF communications signals 60D(1)-60D(R). The downlink optical RF communications signals 60D(1)-60D(R) are communicated over downlink optical fiber(s) 63D(1) to a plurality of remote antenna units (RAUs) 62(1)-62(P). The notation "1-P" indicates that any number of the referenced component 1-P may be provided. O/E converters provided in the RAUs 62(1)-62(P) convert the downlink optical RF communications signals 60D(1)-60D(R) back into downlink electrical RF communications signals 56D(1)-56D(R), which are provided over downlinks 64(1)-64(P) coupled to antennas 66(1)-66(P) in the RAUs 62(1)-62(P) to client devices 26 in the reception range of the antennas 66(1)-66(P). MAMs 30 can also be included in the RAUs 62(1)-62(P), or provided in the same location, housing, or packaging as the RAUs 62(1)-62(P), to monitor the downlink electrical RF communications signals 56D(1)-56D(R).

Figure 3B:
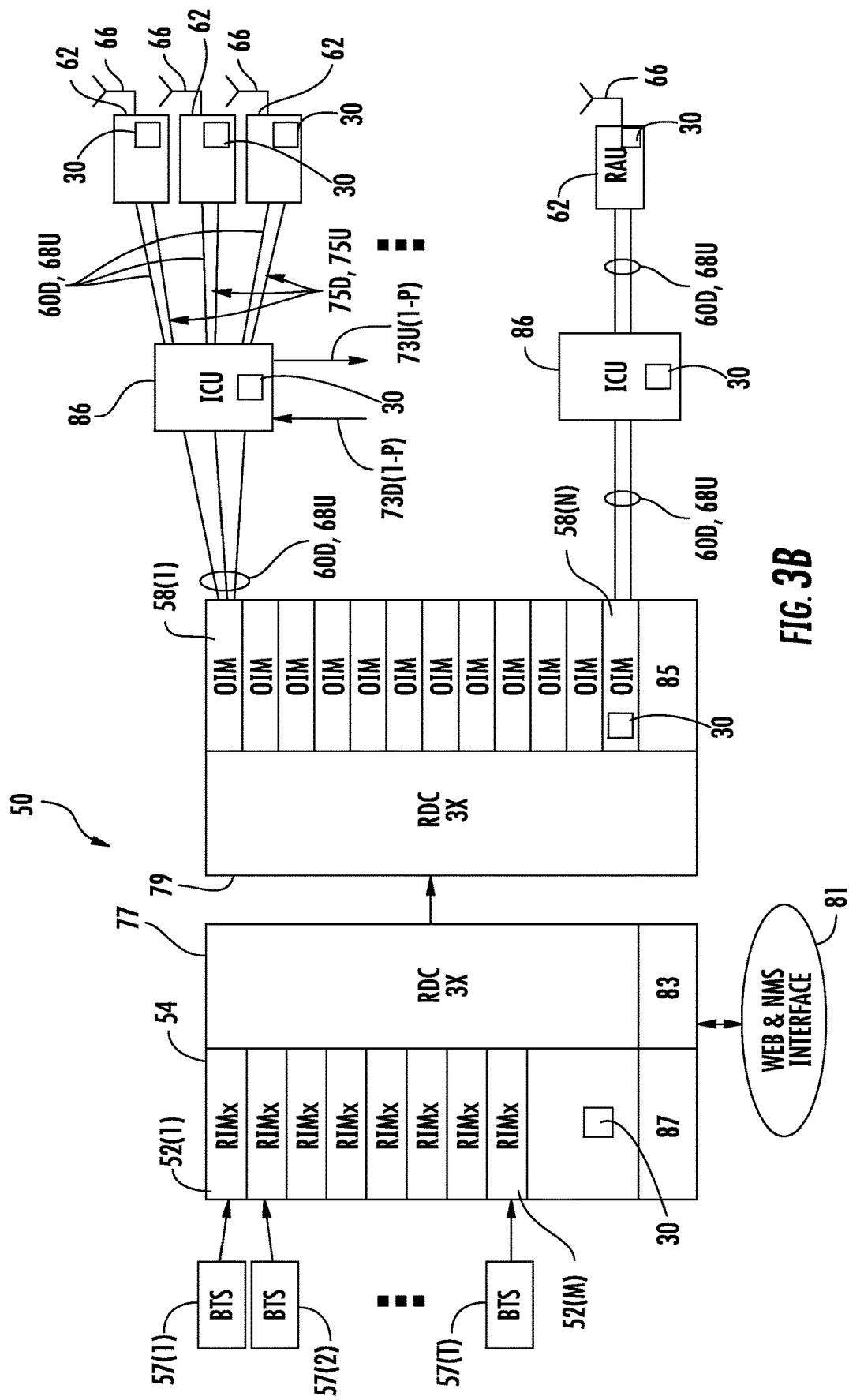

E/O converters are also provided in the RAUs 62(1)-62(P) to convert uplink electrical RF communications signals received from client devices 26 through the antennas 66(1)-66(P) into uplink optical RF communications signals 68U(1)-68U(R) to be communicated over uplink optical fibers 63U to the OIMs 58(1)-58(N). The MAMs 30 associated with the RAUs 62(1)-62(P) can also monitor the uplink electrical RF communications signals 56U(1)-56U(R). The OIMs 58(1)-58(N) include O/E converters that convert the uplink optical RF communications signals 68U(1)-68U(R) into uplink electrical RF communications signals 70U(1)-70U(R) that are processed by the RIMs 52(1)-52(M) and provided as uplink electrical RF communications signals 72U(1)-72U(R). Downlink electrical digital signals 73D(1)-73D(P), such as Ethernet signals, communicated over downlink electrical medium or media (hereinafter "medium") 75D(1)-75D(P) can be provided to the RAUs 62(1)-62(P), such as from a digital data services (DDS) controller and/or DDS switch as provided by example in FIG. 3B, separately from the RF communication services, as well as uplink electrical digital signals 73U(1)-73U(P) communicated over uplink electrical medium 75U(1)-75U(P), as also illustrated in FIG. 3B. MAMs 30 associated with the OIMs 58(1)-58(N) and/or the RIMs 52(1)-52(M) can also monitor the uplink electrical RF communications signals 70U(1)-70U(R). Common elements between FIGS. 3A and 3B are illustrated in FIG. 3B with common element numbers. Power may be provided in the downlink and/or uplink electrical medium 75D(1)-75D(P) and/or 75U(1)-75U(P) to the RAUs 62(1)-62(P).

FIG. 3B is a schematic diagram of providing digital data services and RF communication services to RAUs and/or other remote communications units in the optical fiber-based DAS 50 of FIG. 3A. Common components between FIGS. 3A and 3B have the same element numbers and thus will not be re-described. As illustrated in FIG. 3B, a power supply module (PSM) 83 may be provided to provide power to the RIMs 52(1)-52(M) and radio distribution cards (RDCs) 77 that distribute the RF communications from the RIMs 52(1)-52(M) to the OIMs 58(1)-58(N) through RDCs 79. In one embodiment, the RDCs 77, 79 can support different sectorization needs. A PSM 85 may also be provided to provide power the OIMs 58(1)-58(N). An interface 81, which may include web and network management system (NMS) interfaces, may also be provided to allow configuration and communication to the RIMs 52(1)-52(M) and other components of the optical fiber-based DAS 50. A microcontroller, microprocessor, or other control circuitry, called a head-end controller (HEC) 87 may be included in HEE 54 to provide control operations for the HEE 54. The MAMs 30 may also be incorporated into or associated with one or more interconnect units (ICUs) 86, as shown in FIG. 3B, to monitor power signals as the ICUs 86 provide power signals to the RAUs 62(1)-62(P) or route information about other monitored signals to other components or other MAMs 30 in the DAS 50.

Figure 4:
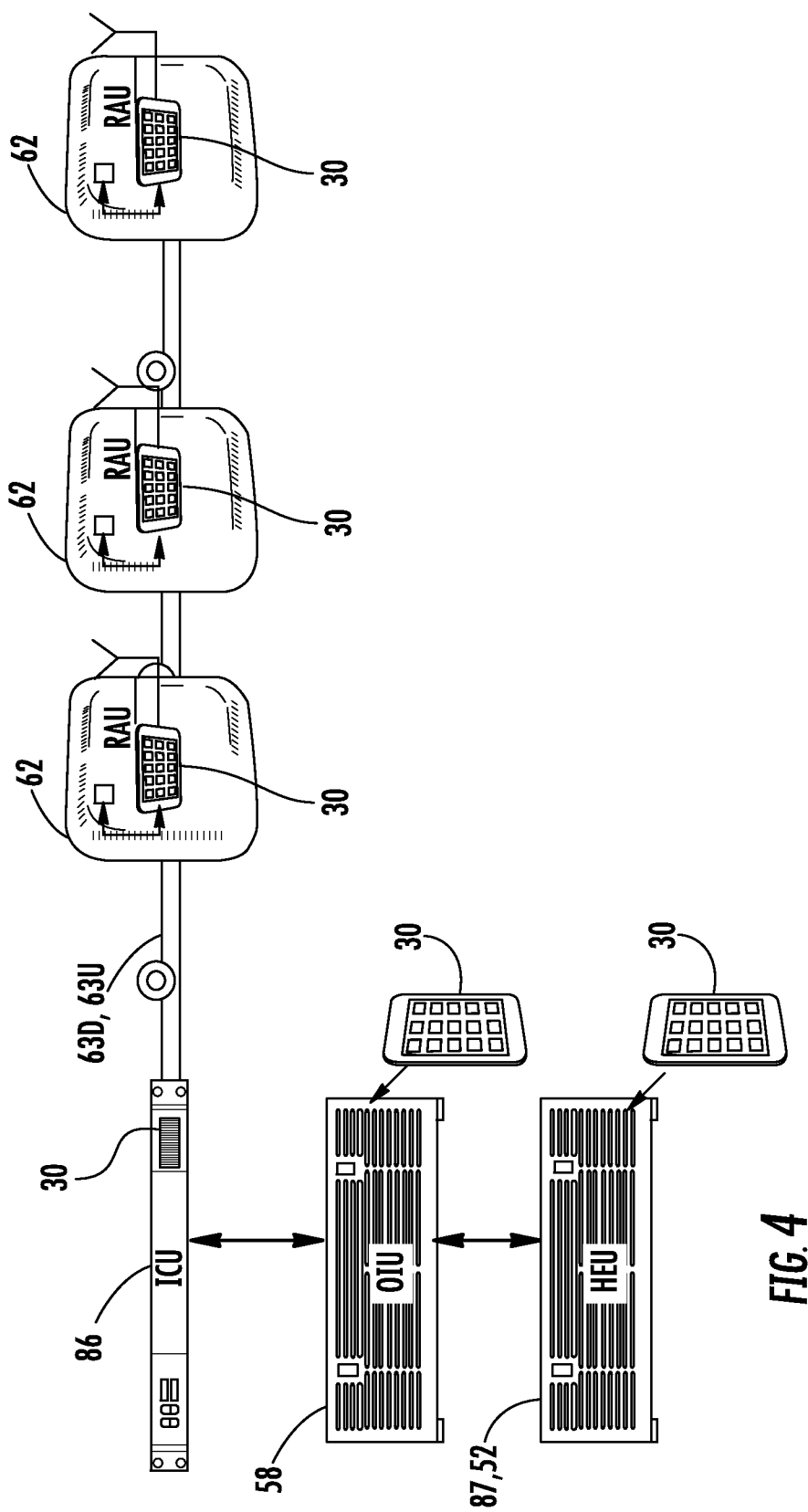
FIG. 4 is a schematic diagram of exemplary DAS components of a DAS in which the MAM in FIG. 2 can be associated to monitor live signals in the WDS, create application level information about the monitored signals, and communicate the application level information to other systems.

FIG. 4 is another schematic diagram of exemplary DAS components of the DAS 50 in which the MAM 30 in FIG. 2 can be associated with to monitor live signals in the WDS, create application level information about the monitored signals, and communicate the application level information to other systems. The MAM 30 can communicate application layer data 38 as client devices in the DAS 50 to other devices outside the DAS 50, or to other MAMs 30 in other components in the DAS 50. The MAM 30 may also serve as a network device, such as an access point, to collect monitored signal information, including application level information, from other MAMs 30 and/or components in the DAS 50, which can be passed along to other components or systems.

Figure 5:
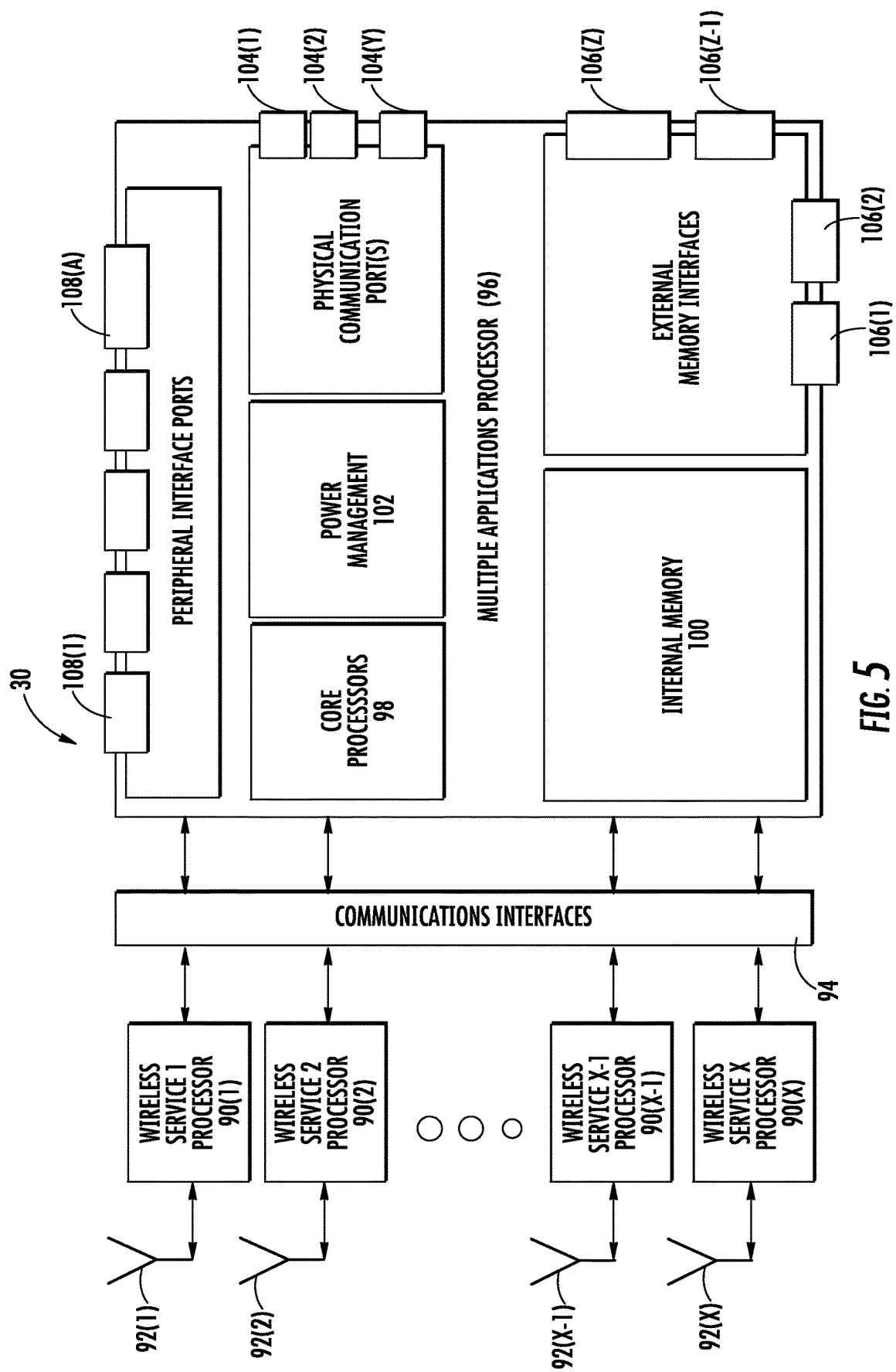
FIG. 5 is a schematic diagram illustrating exemplary internal components of the MAM in FIG. 2 to monitor signals in a component of a WDM.

FIG. 5 is a schematic diagram illustrating exemplary internal components of the MAM 30 in FIG. 2 to monitor signals in a component of a WDS, including but not limited to the DAS 50 in FIGS. 3A and 3B. As illustrated in FIG. 5, the MAM 30 includes a series of wireless service processors 90(1)-90(X) that are configured to receive wireless communications signals over respective antennas 92(1)-92(X). The wireless service processors 90(1)-90(X) facilitate the MAM 30 communicating application level information 38 received through a communications interface 94 wirelessly in a WDS, as another client device. The wireless service processors 90(1)-90(X) also facilitate the MAM 30 being able to communicate application level information 38 wired or wirelessly to other systems outside the WDS, if desired.

With continuing reference to FIG. 5, the MAM 30 includes a processor-based system 96 that may include multiple processors or a multi-core processor 98, as examples, (hereinafter "processor 98") where the application layer applications 32 reside and are executed. As discussed above, the application layer applications 32 monitor signals in a WDS and provide the application level information 38 regarding such monitored signals over the communications interface 94 to other systems, within and/or outside of a WDS. The application layer applications 32 are stored in internal memory 100. The application level information 38 can also be stored by the processor 98 in the internal memory 100. The processor-based system 96 includes a power management module 102 to manage power consumption in the processor-based system 96, such as to achieve the desired performance levels. The MAM 30 also includes one or more physical communications ports 104(1)-104(Y) to allow wired communications to be provided to and from the MAM 30, if desired. For example, a technician may connect a wired communication device to one of the physical communications ports 104 to retrieve application level information 38 or load or update application layer applications 32. The MAM 30 may also include one or more external memory interfaces 106(1)-106(Z), such as memory card ports, USB ports, etc. for storing data from internal memory 100, including application level information 38. The MAM 30 may also include one or more peripheral interface ports 108(1)-108(A) for connecting other peripheral devices to the MAM 30.

Figure 6:
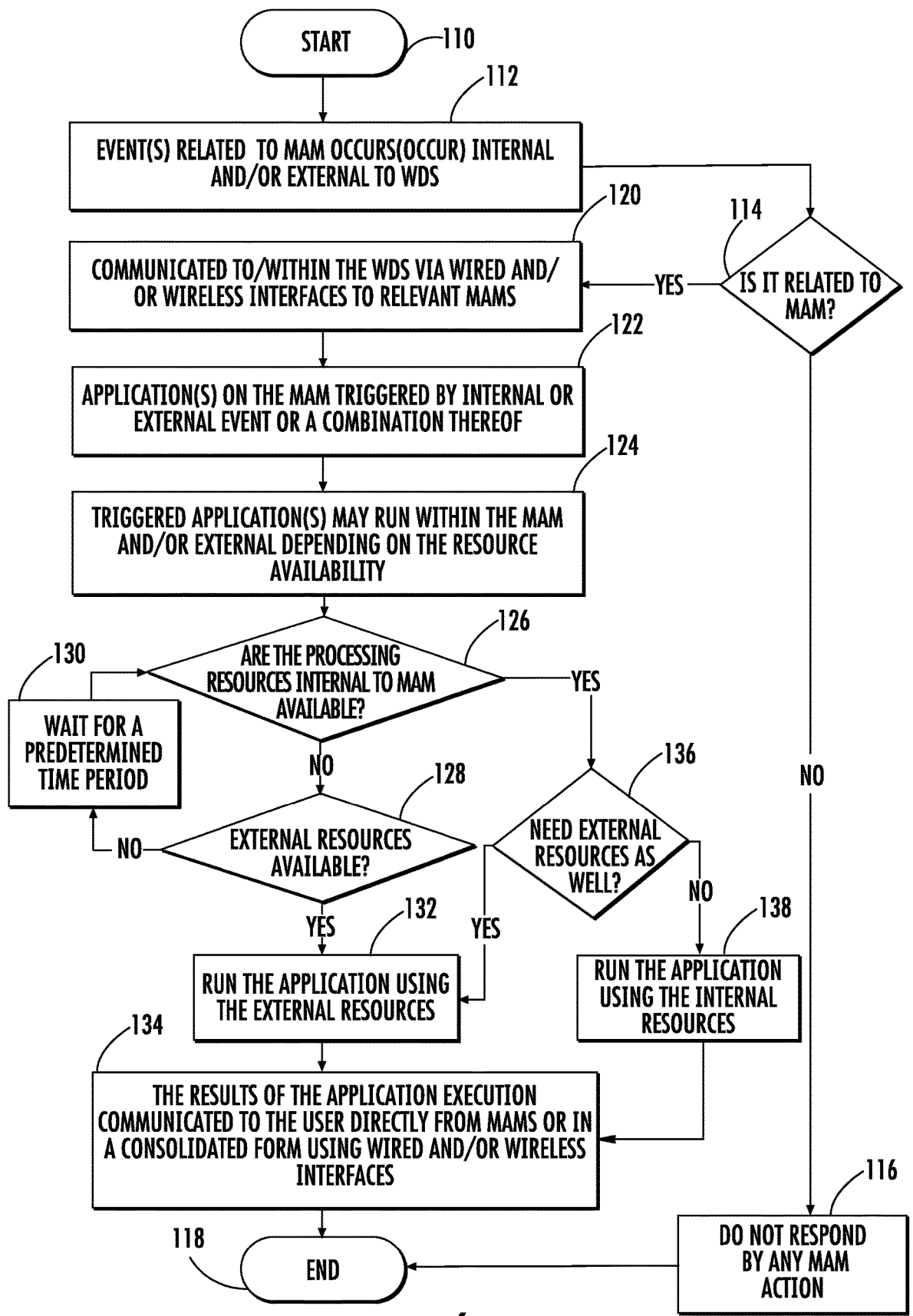
FIG. 6 is a flowchart illustrating an exemplary process of a MAM to monitor live signals in the WDS, create application level information about the monitored signals, and communicate the application level information to other systems.
Figure 7:
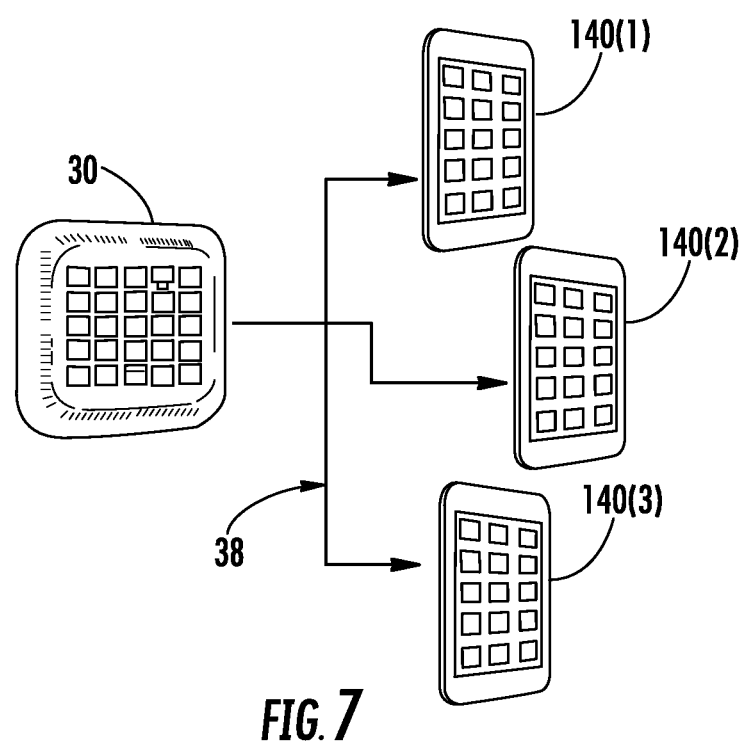
FIG. 7 is schematic diagram of a MAM wirelessly communicating application level information about monitored signals to other portable devices.

FIG. 6 is a flowchart illustrating an exemplary process of a MAM 30 monitoring live signals in the WDS, creating application level information about the monitored signals, and communicating the application level information to other systems. This process can be performed according to an application layer application 32 executing in the processor 98 of the MAM 30. In this regard, the process starts (block 110). External or internal events related to monitoring of signals in a WDS or request for the application level information 38 for MAM 30 will occur (block 112). If the MAM 30 determines that these events are not related (block 114), the MAM 30 does not respond to such events (block 116) and the process ends (block 118). If the event detected by the MAM 30 is related to monitoring of signals or requests to communicate the application level information 38 to other systems in the MAM 30 (block 114), the MAM 30 communications to or within the WDS via wired or wireless communications related to the detected event (block 120). The application layer application 32 on the MAM 30 is triggered by the internal or external event, or a combination thereof (block 122). The triggered application layer application 32 may execute with the MAM 30 and/or external to the MAM 30 depending on resource availability in the MAM 30 (block 124). If there are not sufficient processing resources available in the MAM 30 (block 126), the MAM 30 determines if there are external resources available (block 128). If not, the MAM 30 waits until resources are available to process the event (block 130). Once resources are available, the application layer application 32 is executed using the external resources to process the event relating to monitoring of signals in a WDS (block 132). The application level information 38 generated by the application layer application 32 executing based on signal monitoring can be communicated directly to a user from the MAM 30 or in a consolidated form with other application level information 38 stored in internal memory 100 using wired or wireless communications (block 134), and the process ends (block 118). For example, FIG. 7 is a schematic diagram of a MAM 30 wirelessly, or through wired communication, communicating application level information 38 about monitored signals to other portable devices 140(1)-140(3). With reference back to FIG. 6, if internal resources were available in the MAM 30 to process the signal monitoring event (block 126), and external resources are not needed (block 136), the MAM 30 can simply execute the application layer application 32 to process the monitored signals to generate the application level information 38 (block 138).

Figure 8:
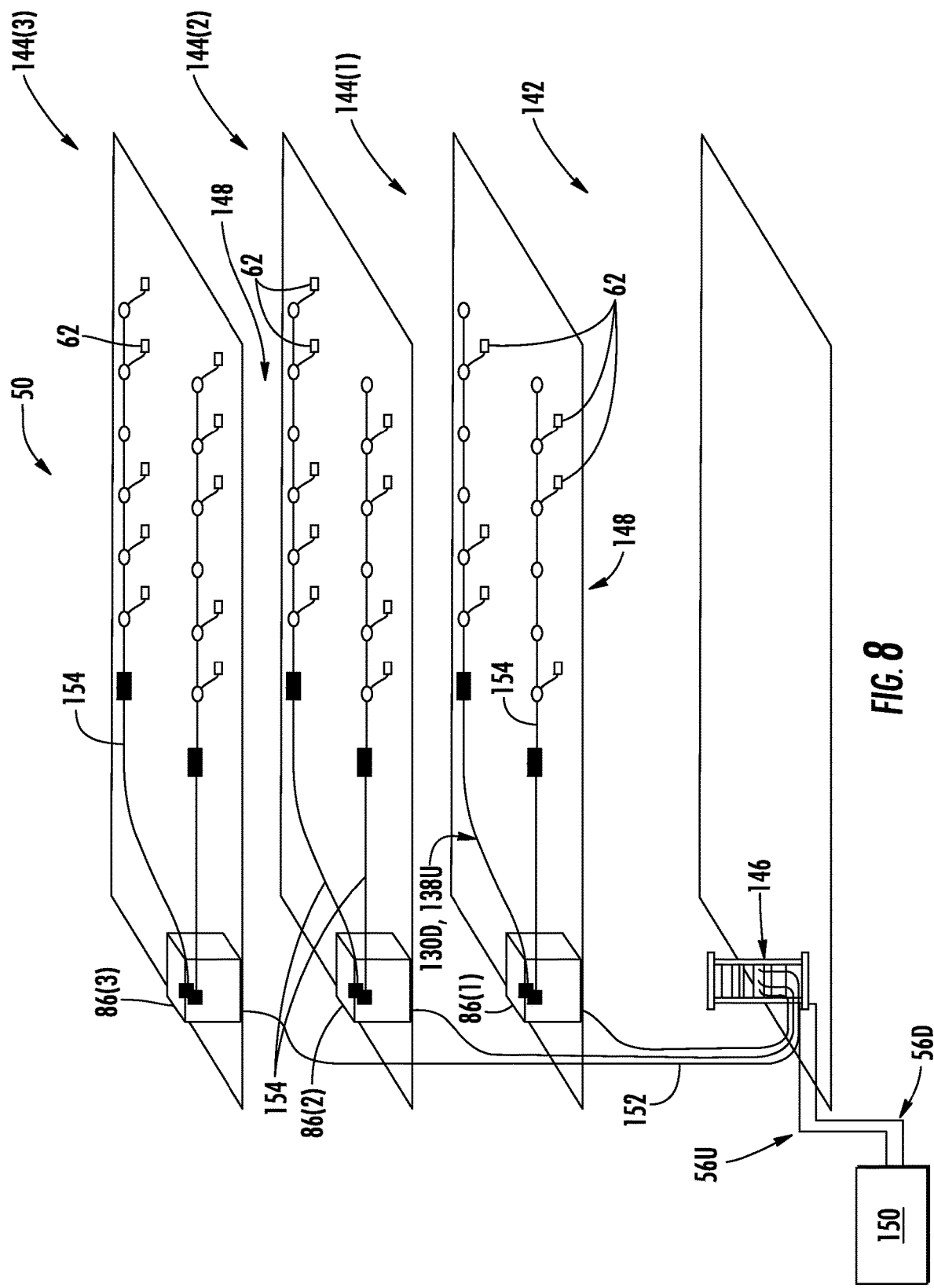
FIG. 8 is a partially schematic cut-away diagram of an exemplary building infrastructure in which a DAS including one or more components associated with MAMs can be employed.

The DAS 50 in FIGS. 3A and 3B may also be provided in an indoor environment, as illustrated in FIG. 8. FIG. 8 is a partially schematic cut-away diagram of a building infrastructure 142 employing the DAS 50 described herein. The building infrastructure 142 in this embodiment includes a first (ground) floor 144(1), a second floor 144(2), and a third floor 144(3). The floors 144(1)-144(3) are serviced by the central unit 146 to provide the antenna coverage areas 148 in the building infrastructure 142. The central unit 146 is communicatively coupled to the base station 150 to receive downlink communications signals 56D from the base station 150. The central unit 146 is communicatively coupled to the remote antenna units 132 to receive the uplink communications signals 56U from the remote antenna units 62, as previously discussed above. The downlink and uplink communications signals 56D, 56U communicated between the central unit 146 and the remote antenna units 62 are carried over a riser cable 152. The riser cable 152 may be routed through interconnect units (ICUs) 86(1)-86(3) dedicated to each floor 144(1)-144(3) that route the downlink and uplink communications signals 56D, 56U to the remote antenna units 62 and also provide power to the remote antenna units 62 via array cables 154.

Figure 9:
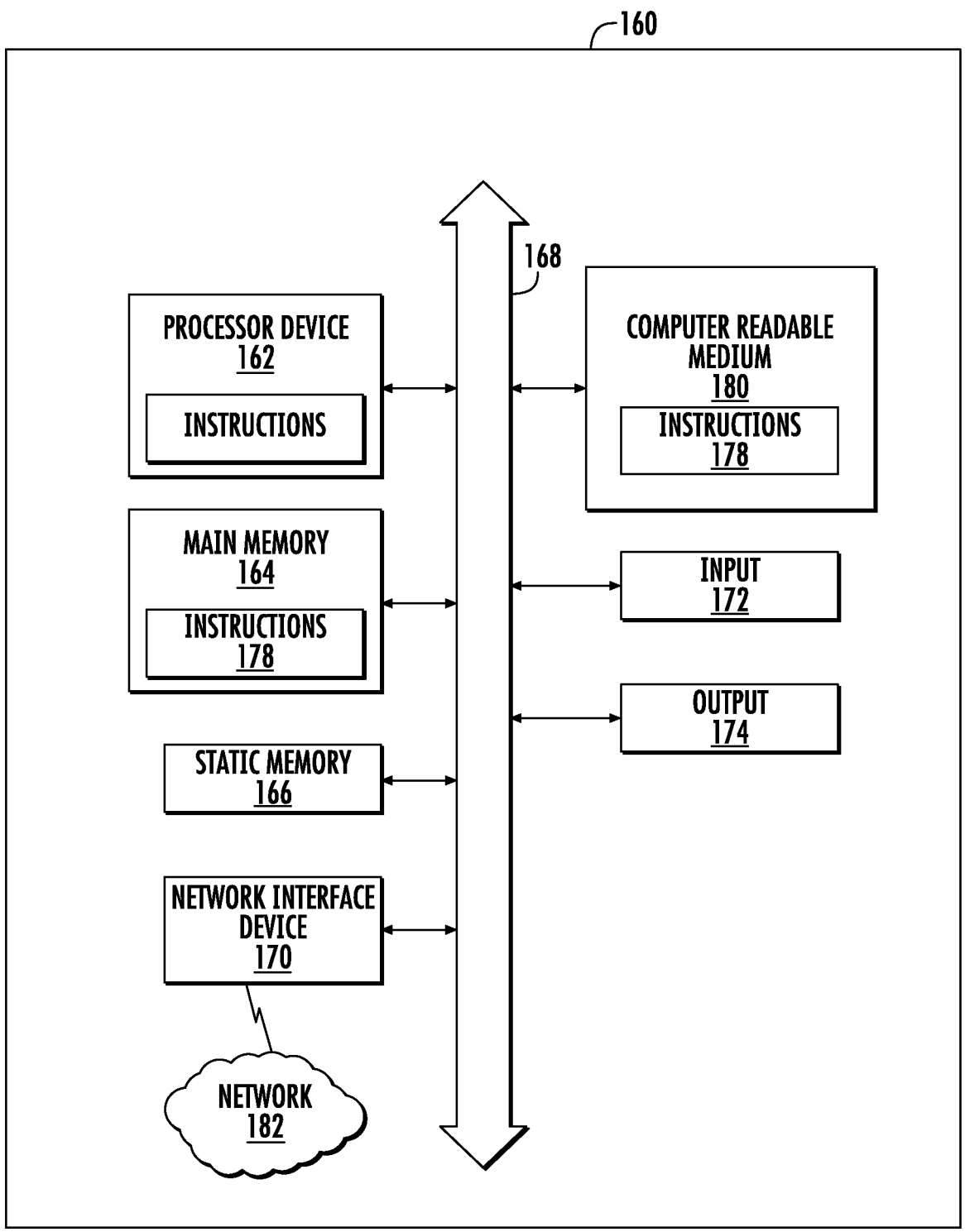
FIG. 9 is a schematic diagram of a generalized representation of an exemplary computer system that can be included in a MAM provided in the WDS, wherein the exemplary computer system is adapted to execute instructions from an exemplary computer readable medium.

FIG. 9 is a schematic diagram representation of additional detail illustrating a computer system 160 that could be employed in any MAM 30 disclosed herein. The computer system 160 is adapted to execute instructions for an application layer application 32 from an exemplary computer-readable medium to perform these and/or any of the functions or processing described herein. In this regard, the computer system 160 in FIG. 9 may include a set of instructions that may be executed to calculate gain of DAS segment in a DAS. The computer system 160 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 160 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 160 in this embodiment includes a processing device or processor 162, a main memory 164 (e.g., read-only memory (ROM), flash memory, dynamic random access memory (DRAM), such as synchronous DRAM (SDRAM), etc.), and a static memory 166 (e.g., flash memory, static random access memory (SRAM), etc.), which may communicate with each other via a data bus 168. Alternatively, the processor 162 may be connected to the main memory 164 and/or static memory 166 directly or via some other connectivity means. The processor 162 may be a controller, and the main memory 164 or static memory 166 may be any type of memory. Application level information 38 may be stored in static memory 166.

The processor 162 represents one or more general-purpose processing devices, such as a microprocessor, central processing unit, or the like. The processor 162 may be the processor 98 in the MAM 30 in FIG. 5. More particularly, the processor 162 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 162 is configured to execute processing logic in instructions for performing the operations and steps discussed herein.

The computer system 160 may further include a network interface device 170. The computer system 160 also may or may not include an input 172, configured to receive input and selections to be communicated to the computer system 160 when executing instructions. The computer system 160 also may or may not include an output 174, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 160 may or may not include a data storage device that includes instructions 178 stored in a computer-readable medium 180. The instructions 178 may also reside, completely or at least partially, within the main memory 164 and/or within the processor 162 during execution thereof by the computer system 160, the main memory 164 and the processor 162 also constituting computer-readable medium. The instructions 178 may further be transmitted or received over a network 182 via the network interface device 170.

While the computer-readable medium 180 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A communications system, comprising:
   a central unit configured to:
      distribute a downlink communications signal over at least one downlink optical communications medium to a plurality of remote units;
      receive an uplink communications signal from the plurality of remote units over at least one uplink optical communications medium; and
      distribute the uplink communications signal to a communications system;
   each remote unit among the plurality of remote units configured to:
      receive the downlink communications signal from the central unit over the at least one downlink optical communications medium;
      distribute the downlink communications signal to a client device;
      receive the uplink communications signal from the client device; and
      distribute the uplink communications signal to the central unit over the at least one uplink optical communications medium;
   at least one multiple application module (MAM) associated with at least one of the central unit and at least one of the remote units among the plurality of remote units, the at least one MAM comprising at least one processor configured to execute at least one application layer application to analyze the at least one of the downlink communications signal and the uplink communications signal, at least one memory, and at least one communications interface, wherein the at least one MAM is configured to:
      receive at least one of the downlink communications signal and the uplink communications signal;
      communicate application level information regarding the analyzed at least one of the downlink communications signal and the uplink communications signal to another system;
      store the application level information in memory; and
      communicate the application level information to a client device.

2. The communications system of claim 1, wherein the at least one MAM is further configured to communicate the application level information over the at least one downlink optical communications medium.

3. The communications system of claim 1, wherein the at least one MAM is further configured to communicate the application level information over the at least one uplink optical communications medium.

4. The communications system of claim 1, wherein the at least one MAM is further configured to receive a downlink communications signal as a client device.

5. The communications system of claim 1, wherein:
   the at least one MAM is further configured to receive at least one power signal; and
   the at least one processor in the at least one MAM is further configured to execute an application layer application to analyze the at least one power signal; and
   the at least one MAM is further configured to communicate application level information regarding the analyzed at least one power signal to another system.

6. The communications system of claim 1, wherein:
   the at least one MAM is further configured to receive at least one RF power signal;
   the at least one processor in the at least one MAM is further configured to execute an application layer application to analyze the at least one RF power signal; and
   the at least one MAM is further configured to communicate application level information regarding the analyzed at least one RF power signal to another system.

7. The communications system of claim 1, wherein the at least one optical downlink communications medium is comprised of at least one downlink optical fiber, and the at least one uplink optical communications medium is comprised of at least one uplink optical fiber.

8. The communications system of claim 7, wherein the at least one MAM is further configured to communicate the application level information over the at least one downlink optical communications medium, and to communicate the application level information over the at least one uplink optical communications medium.

9. The communications system of claim 7, wherein the at least one MAM is further configured to load a new application layer application into memory to be executed by the at least one processor to analyze the at least one of the downlink communications signal and the uplink communications signal.

10. The communications system of claim 7, wherein the central unit comprises at least one electrical-to-optical converter.

11. The communications system of claim 1, wherein the at least one downlink optical communications medium and the at least one uplink optical communications medium is comprised of at least one common optical communications medium.

12. The communications system of claim 11, wherein the at least one MAM is further configured to communicate the application level information over the at least one common optical communications medium.

13. The communications system of claim 11, wherein the at least one MAM is further configured to load a new application layer application into memory to be executed by the at least one processor to analyze the at least one of the downlink communications signal and the uplink communications signal.

14. The communications system of claim 11, wherein the central unit comprises at least one electrical-to-optical converter.

15. A method of monitoring signals in a communications system, comprising:
receiving a downlink communications signal;
distributing the downlink communications signal over at least one optical downlink communications medium to a plurality of remote units;
receiving an optical uplink communications signal from the plurality of remote units over at least one optical uplink communications medium in a central unit;
distributing the received downlink communications signal in each remote unit among the plurality of remote units to a client device;
receiving the optical uplink communications signal in each remote unit among the plurality of remote units from the client device;
distributing the received optical uplink communications signal in each remote unit among the plurality of remote units to the central unit;
executing at least one application layer application in at least one processor in at least one multiple application module (MAM) associated with at least one of the central unit and at least one of the remote units among the plurality of remote units to analyze the at least one of the downlink communications signal and the optical uplink communications signal;
communicating application level information regarding the analyzed at least one of the downlink communications signal and the optical uplink communications signal to another system over the at least one optical downlink communications medium.

16. The method of claim 15, wherein receiving a downlink communications signal from a communications system in a central unit comprises receiving an electrical downlink communications signal.

17. The method of claim 16, further comprising converting the electrical downlink communications signal into optical downlink communications signal.

18. The method of claim 17, further comprising loading a new application layer application into memory in the at least one MAM to be executed by the at least one processor to analyze the at least one of the downlink communications signal and the optical uplink communications signal.

* * * * *